United States Patent
Meisert et al.

[11] 3,875,118
[45] Apr. 1, 1975

[54] THERMOPLASTIC POLYURETHANES AND A TWO-STAGE PROCESS FOR THEIR PREPARATION

[75] Inventors: Ernst Meisert, Leverkusen; Wilhelm Goyert, Koeln, both of Germany

[73] Assignee: Bayer Aktiengesellschaft, Leverkusen, Germany

[22] Filed: Sept. 26, 1973

[21] Appl. No.: 400,782

[30] Foreign Application Priority Data
Oct. 3, 1972 Germany............ 2248382

[52] U.S. Cl.......... 260/75 NP, 8/115.6, 260/75 NE, 260/75 NP, 260/75 NQ, 260/77.5 AP, 260/77.5 AA, 260/77.5 AM
[51] Int. Cl... C08g 22/06, C08g 53/00, C08g 53/16
[58] Field of Search...... 260/75 NP, 75 NQ, 75 NE, 260/77.5 AP, 77.5 AM, 77.5 AA

[56] References Cited
UNITED STATES PATENTS
3,211,701  10/1965  Müller et al.................. 260/75 NP

*Primary Examiner*—H. S. Cockeram
*Attorney, Agent, or Firm*—Gene Harsh

[57] ABSTRACT

Polyurethane elastomers suitable for coating textiles, leather, paper and similar substrate and a multi-stage process for their production. The polyurethane elastomers are obtained from
a. a polyol with an average molecular weight between 900 and 5300,
b. 4,4'-diisocyanatodiphenylmethane and
c. a diol with a molecular weight below 500, characterized in that the equivalent ratio ((b)/(a)+(c)) is between 0.87 and 1 and in that (a) contains at least 40% by weight of a polyurethane of the formula

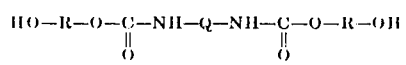

where R is a divalent group such as can be obtained by removing the hydroxyl groups from a diol which has a molecular weight of between 700 and 1750, and Q is a divalent aliphatic, cycloaliphatic, araliphatic or aromatic group which contains 2 to 20, and preferably, 4 to 15, carbon atoms; but Q is not

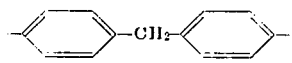

11 Claims, No Drawings

THERMOPLASTIC POLYURETHANES AND A TWO-STAGE PROCESS FOR THEIR PREPARATION

BACKGROUND OF THE INVENTION

This invention relates to new thermoplastic polyurethanes, their preparation and their use as coating compounds.

Polyurethane systems for coating textiles, leather, paper and similar substrates have been known for a long time (see e.g. Saunders and Frisch, Polyurethanes, Chemistry and Technology, Part 1 pages 7–9). Thermoplastic polyurethanes which can be processed as solvent free compounds on calenders or melting and laminating rollers are also known. In comparison to polyurethanes which have to be processed from solution they have the advantage of requiring no solvent and therefore they do not pollute the environment with solvent vapors. Thermoplastic polyurethane elastomers have nevertheless been used to only a limited extent in the past because it is very difficult to obtain products with a wide melting range. It is therefore necessary to control the operating temperature very accurately in order to prevent viscosity variations in the solvent-free melt. Although thermoplastic polyurethane elastomers which contain soft segments of polyesters or polyethers with an average molecular weight below 1000 have sufficient mechanical strength, their low temperature behavior is unsatisfactory and they harden in cold weather. Polyols with molecular weights above 1500 and preferably above 2000 are therefore generally used to improve the low temperature behavior. Such higher molecular weight compounds, however, give rise to other disadvantages in that the disturbing effect of monofunctional impurities increases with the chain length of the polyol so that the articles produced have reduced mechanical strength and occasionally there is an efflorescence of low molecular weight urethane constituents on the surface of the products.

Another disadvantage of the previously known polyurethane elastomers used as thermoplastic materials is their high elasticity. This gives rise to trouble in many fields of application, for example, textiles coated with these substances make a loud rustling noise and crackle when used as garments and, moreover, have a rubber-like handle.

It is an object of this invention, therefore, to produce thermoplastic elastomers which have excellent resistance to low temperature and melt uniformly within a wide temperature range, i.e., they have a melt viscosity which is practically independent of the temperature over a range of more than about 10°C. In addition, it is desired to prevent the efflorescence of low molecular weight constituents on the surface of thermoplastic elastomer coatings and to obtain coatings which have a leather-like handle and low recoil elasticity.

SUMMARY OF THE INVENTION

These objectives are satisfied, or substantially satisfied, according to the invention by providing new polyurethane elastomers which can be processed thermoplastically, obtained from
 a. a polyol with an average molecular weight between 900 and 5300,
 b. 4,4'-diisocyanatodiphenylmethane and
 c. a diol with a molecular weight below 500, characterized in that the equivalent ratio (b)/(a) + (c) is between 0.87 and 1 and in that (a) contains at least 40% by weight of a polyurethane of the formula

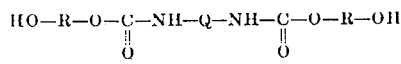

in which
 R is a divalent group such as can be obtained by removing the hydroxyl groups from a diol which has a molecular weight of between 700 and 1750 and
 Q is a divalent aliphatic, cycloaliphatic, araliphatic or aromatic group which contains 2 to 20, preferably 4 to 15 carbon atoms and which is derived from corresponding polyisocyanates, but Q is not

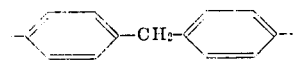

The invention also relates to a multi-stage process for the production of polyurethane elastomers which can be processed thermoplastically, characterized in that in the first reaction stage, a polyol with a molecular weight of between 700 and 1750 is reacted with 0.2 to 0.7 equivalents, per equivalent of the polyol employed, of a diisocyanate other than 4,4'-diisocyanatodiphenylmethane to convert it into a urethane with terminal OH groups, and this intermediate product is then reacted in known manner with 4,4'-diisocyanatodiphenylmethane and glycols which have a molecular weight below 500 by a single stage or multi-stage reaction.

The invention also relates to the use of such polyurethanes for the production of foils and for laminating substrates such as textiles, leather or paper by application of the solvent-free melt or solutions of the polyurethanes.

DETAILED DESCRIPTION

Polyols with molecular weights of between 700 and 1750 which may be used for the process according to the invention include, for example, hydroxyl polyesters, polyethers, polyhydric polythioethers, polyacetals, polycarbonates and polyester amides which are known per se for the production of cellular and non-cellular polyurethanes. Polyesters and polyethers which contain two hydroxyl groups are preferred.

The polyesters containing hydroxyl groups are prepared by reacting dihydric alcohols with preferably dibasic carboxylic acids or carboxylic acid anhydrides. Examples of suitable dibasic carboxylic acids or anhydrides for preparing these polyesters are succinic acid, adipic acid, suberic acid, azelaic acid, sebacic acid, phthalic acid, isophthalic acid, phthalic acid anhydride, maleic acid anhydride, as well as carbonic acid. Suitable diol components are, for example, ethylene glycol, propylene glycol-(1,2) and -(1,3), butylene glycol-(1,4) and -(2,3), hexane-1,6-diol, octane-1,8-diol, diethylene glycol, polyethylene glycols, tripropylene glycol, oligopropylene glycols, dibutylene glycol and polybutylene glycols. Any suitable polyester amide may be used by replacing some of the glycol used in the preparation of hydroxyl polyesters with an organic diamine, an amine alcohol or lactam such as, ethylene diamine, 1,4-butane diamine, 1,6-hexane diamine, 1,4-pentane diamine, 2,4-and 2,6tolylene diamine, 4,4'-diamino diphenylmethane, xylylene diamine, 1,4-cyclohexane diamine, phenylene diamine, naphthalene diamine, aminoethyl alcohol, aminopropyl alcohol, aminobutyl alcohol, hydroxyethyl-aminoethyl ether, caprolactam, Δ-valerolactam and the like. Difunctional polyesters suitable for the invention may also be obtained from the polymerization of lactones such as caprolactone or the polycondensation of hydroxycarboxylic acids such as w-hydroxycarboxylic acids.

Polyesters of adipic acid and divalent glycols are preferred.

Polyethers which contain hydroxyl groups, preferably two hydroxyl groups, may also be used for producing the products according to the invention. These polyethers may be obtained in known manner by the polymerization of epoxides such as ethylene oxide, propylene oxide, butylene oxide, tetrahydrofuran, styrene oxide or epichlorhydrin. Each of these epoxides may be homopolymerized, e.g., in the presence of $BF_3$, or one or more of these epoxides may be added, either as mixtures or successively, to starter compounds which contain reactive hydrogen atoms, e.g. water, ethylene glycol, propylene glycol-(1,3) or -(1,2), 4,4'-dihydroxydiphenyl-propane or ethanolamine. For other processes, see for example the processes described in the "Encyclopedia of Chemical Technology", Volume 7, pages 257 to 262, published by Interscience Publishers in 1951, or in U.S. Pat. No. 1,922,459.

Any suitable dihydric polythioether may be used such as, for example, the reaction product of one of the aforementioned alkylene oxides used in the preparation of the polyhydric polyalkylene ethers with a polyhydric thioether such as, for example, thiodiglycol, 3,3'-dihydroxy propyl sulfide, 4,4'-dihydroxy butyl sulfide, 1,4-(3-hydroxyethyl) phenylene dithioether and the like.

Although the second reaction stage of the process of this invention is restricted to the use of 4,4'-diisocyanatodiphenylmethane as the isocyanate component, the first reaction stage may be carried out using aliphatic, cycloaliphatic, araliphatic, aromatic or heterocyclic polyisocyanates containing 2 to 20, preferably 4 to 15, carbon atoms (with the exclusion of 4,4'-diisocyanatodiphenylmethane), such as, for example, the polyisocyanates described by W. Siefgen in Justus Liebig's "Annalen der Chemie", Volume 562, pages 75–136. The following polyisocyanates are examples: tetramethylene-1,4-diisocyanate, hexamethylene-1,6-diisocyanate, dodecane-1,2-diisocyanate, cyclobutane-1,3-diisocyanate, cyclohexane-1,3- and -1,4-diisocyanate and any mixtures of these isomers, hexahydrotolylene-2,4- and -2,6-diisocyanate, tolylene-2,4-diisocyanate, tolylene-2,6-diisocyanate and any mixtures of these isomers, naphthylene diisocyanate and 1-isocyanato-3,3,5-trimethyl-5-isocyanatomethylcyclohexane. Hexamethylene diisocyanate and tolylene diisocyanate are preferred.

The chain lengthening agents used for the process of the invention are glycols with molecular weights below 500 such as, for example, ethylene glycol, propylene glycol, butylene glycol-(1,2) and -(1,4), hexane-1,6-diol and octane-1,8-diol.

According to the process of the invention, the polyol which has a molecular weight of between 700 and 1750 is first reacted with 0.2 to 0.7 equivalents per equivalent of the polyol, of the diisocyanate which is not 4,4'-diisocyanatodiphenylmethane to produce a resulting urethane containing terminal hydroxyl groups and having an average molecular weight of 900 to 5300 and preferably, 1600 to 3700.

This intermediate product is then reacted in a known manner for example, in the melt by a suitable mixing technique, with 4,4'-diisocyanatodiphenylmethane and glycols which have a molecular weight below 500 to produce the polyurethane elastomers of the invention. The quantity of low molecular weight glycol used is preferably from 2 to 7 times the molar quantity of urethane-containing polyol (the intermediate product). The proportion of 4,4'-diisocyanatodiphenylmethane used is preferably such that the equivalent ratio of it to the polyols is between about 0.87 and 1.

The reaction of the urethane-containing polyol with 4,4'-diphenylmethane diisocyanate and chain lengthening agent, i.e. the lower molecular weight diols, or glycols, may be carried out by a one shot process or alternatively a prepolymer with terminal NCO groups may first be prepared from the urethane polyol and diisocyanate, and this prepolymer may then be cross-linked with the low molecular weight glycol.

The various reactions between the polyols and diisocyanates are generally carried out at reaction temperatures of between 40°C and 240°C. The preferred temperature range is between 80°C and 160°C.

Catalysts, dyes, fillers and plasticizers and preferably also age resistors of a known kind may be added to the reaction mixture. The reaction is exothermic and is completed within a few minutes. The elastomers obtained from the last reaction stage can be granulated directly in cutting mills when cold and then worked up as thermoplasts in the usual manner. Alternatively, dyes, fillers and the like may be incorporated in the elastomer in an extrusion process before the product is granulated. It is particularly advantageous, however, to carry out the reaction in double screw extruders with helically arranged blades and then to pelletize the material discharged from the extruder.

To facilitate processing on calender rollers, it is advantageous to incorporate 0.2 to 2% by weight of lubricant and mold release waxes at the extrusion stage but they may also be added to the reaction mixture at any earlier stage of the process. The lubricant and mold release waxes used may be, for example, fatty acid esters, fatty acid amides, oxidized polyethylenes and other microcrystalline waxes. Small quantities of silicone oil may also be added.

When used as foils, textile coatings or surface finishes for leather, the polyurethanes prepared according to the invention are not subject to the efflorescence of low molecular weight constituents and they have a leather-like handle and low recoil elasticity and, therefore, satisfactory wearing properties. They are also distinguished by their high mechanical strength, exceptionally advantageous low temperature behavior and the ease with which they can be processed by melting on calender rollers. The elastomers according to the invention are practically constant in their viscosity over a range of more than 10°C above their softening point.

For some purposes it is also advantageous that the elastomers are soluble in strong solvents (e.g. dimethylformamide, tetrahydrofuran) because this enables them also to be used as backcoats, adhesive coats and bonding agents.

The invention may be understood more fully by referring to the examples that follow.

EXAMPLES

Example 1

100 parts by weight of a polyester from hexanediol and adipic acid with OH number 112 (molecular weight 1000) and 8.7 parts by weight of tolylene diisocyanate (2,4/2,6-isomeric mixture= 65 : 35) were stirred together for one hour at 110°C. The OH number of the resulting diol-urethane was 51.4.

100 parts by weight of this polyurethane, 11 parts by weight of butane-1,4-diol, 2 parts by weight of 2,6-bis-(di-t-butyl-phenyl)-carbodiimide and 1.5 parts by weight of silicone oil were stirred together at 120° to 140°C. 39.2 parts by weight of 4,4'-diisocyanatodiphenylmethane (NCO : OH = 0.93) were added with vigorous stirring and the reaction mixture was poured into a mold coated with mold release wax. When cold, the resulting mixture was granulated in cutting mills.

Part of this granulate was processed into test samples by injection molding.

| Test values: | $\sigma$ 100 | = 56 kp/cm$^2$ |
|---|---|---|
| DIN 53504 | $\sigma$ 300 | = 118 kp/cm$^2$ |
|  | $\sigma$ at rupture | = 323 kp/cm$^2$ |
| DIN 53512 | Recoil elasticity | = 19% |

The remainder of the granulate was made up into foils on melting and laminating rollers and directly bonded to textiles.

A characteristic feature of these elastomers was the wide temperature range (170° to 210°C) within which they could be worked up. The foils and coated textiles had a pleasant, leather-like handle. Freshly added granulate melted rapidly and left no streaks on the coating.

Comparison Test 1a (without preliminary chain lengthening)

100 parts by weight of a polyester of hexane-1,6-diol and adipic acid (OH number 52.5) were directly reacted with 11 parts by weight of butane-1,4-diol, 2 parts by weight of bis-(2,6-di-t-butylphenyl)-carbodiimide and 39.4 parts by weight of 4,4'-diisocyanatodiphenylmethane as described above without being first modified, and the reaction product was granulated and processed.

| Test values: | $\sigma$ 100 | = 59 kp/cm$^2$ |
|---|---|---|
|  | $\sigma$ 300 | = 122 kp/cm$^2$ |
|  | $\sigma$ at rupture | = 318 kp/cm$^2$ |
|  | Recoil elasticity | = 37 % |

The temperature range within which the product could be processed on melting rollers was very narrow, in this case being between 180° and 185°C. The foils were streaky, i.e. the material was not homogeneous. Due to the high recoil elasticity, the foils and coated fabrics had a rubbery handle.

The foils from Experiments 1 and 1a were stored in a refrigerator at 0°C±2°C for 3 days. After this storage, the foils from Example 1 were still soft and supple but the foils obtained according to 1a had undergone considerable hardening.

Example 2

100 parts by weight of a polyester of butane-1,4-diol and adipic acid (molecular weight 700, OH number 160) and 12.9 parts by weight of tolylene diisocyanate (ratio of isomers 2,4 : 2,6 = 80 : 20) were stirred together at 80°C for one-half hours (molecular weight of the reaction product = 1590;OH number =70.5).

100 parts by weight of this diol-urethane were reacted with 25 parts by weight of hexane-1,6-diol and 3 parts by weight of polysiloxane oil (molecular weight approximately 3000) and 67,5 parts by weight of 4,4'-diisocyanatodiphenylmethane (NCO/OH = 0.97) at 100—140°C by a "one-shot" process. The products were then processed as in Example 1. Test values:

| DIN 53504 | $\sigma$ 100 | = 90 kp/cm$^2$ |
|---|---|---|
|  | $\sigma$ 300 | = 180 kp/cm$^2$ |
|  | $\sigma$ at rupture | = 418 kp/cm$^2$ |
| DIN 53512 | Recoil elasticity: | = 17% |

The temperature range within which the product could be worked upon melting rollers was very wide (180° to 215°C). The foils were free from tackiness and had a pleasant handle.

Comparison Test 2a (without preliminary chain lengthening)

100 parts by weight of a polyester of butane-1,4-diol and adipic acid (molecular weight 1600, OH number 70.4) were reacted with 25 parts by weight of hexane-1,6-diol, 3 parts by weight of polysiloxane oil (molecular weight approximately 3000) and 67.4 parts by weight of 4,4'-diisocyanatodiphenylmethane (NCO-/OH =0.97) at 80° to 100°C by a "one-shot" process. The product was then processed as in Example 1. Test values:

| DIN 53504 | $\sigma$ 100 | = 94 kp/cm$^2$ |
|---|---|---|
|  | $\sigma$ 300 | = 200 kp/cm$^2$ |
|  | $\sigma$ at rupture | = 422 kp/cm$^2$ |
| DIN 53512 | Recoil elasticity: | = 32% |

On melting rollers, the product could only be processed within a narrow temperature range of 200° to 205°C. The granulate took a very long time to melt. The product worked up on the calender rollers was dry and brittle, and freshly added granulate left streaks on the foil when removed from the rollers.

Comparison Test 2b (short chain polyester diols without preliminary chain lengthening)

25 parts by weight of hexane-1,6-diol, 3 parts by weight of polysiloxane oil (molecular weight 3000) and 100 parts by weight of a polyester of butane-1.4-diol and adipic acid (molecular weight 700, OH number 160) were reacted with 86.8 parts by weight of 4,4'-diisocyanatodiphenylemthane (NCO/OH = 0.97 ) at 80°-100°C by a "one-shot" process. The product was then processed as in Example 1. Test Values:

| DIN 53504 | $\sigma$ 100 | = 117 kp/cm$^2$ |
|---|---|---|
|  | $\sigma$ 300 | = 247 kp/cm$^2$ |
|  | $\sigma$ at rupture | = 380 kp/cm$^2$ |
| DIN 53512 | Recoil elasticity: | = 29% |

The granulate took about twice as long to melt on the melting rollers as the granulate obtained in Example 2, The roll obtained in the machine only slowly took up new granulate. The product could only be processed within a narrow temperature range (207°±2°C). The films removed from the rollers were streaky.

When product 2, 2a and 2b were stored in a refrigerator at 5°C, product 2 was still flexible after 24 hours while products 2a and 2b became hard and stiff.

Example 3

100 parts by weight of a polycaprolactone ester (started with butane-1,4-diol) which had a molecular weight of 1700(OH number = 65.8) and 4.98 parts by weight of hexamethylene diisocyanate were stirred together at 130°C for 2 hours (molecular weight of the reaction product = 3580; OH number = 31.3).

100 parts by weight of this diol-urethane 13 parts by weight of diethylene glycol and 4 parts of polysiloxane oil (molecular weight about 7000) were stirred together with 33.5 parts by weight of 4,4'-diisocyanatodiphenylmethane (NCO/OH = 0.89) at 110°–130°C. The product was then processed as described in Example 1. 1.0 part of an oxidized polyethylene wax with an acid number 17 (molecular weight about 2000) and 5 parts of chalk were added to the granulate and the mixture was extruded in a double screw kneader and granulated.

Test Values:

| DIN 53504 | σ 100 | = 55 kp/cm² |
|---|---|---|
| | σ 300 | = 108 kp/cm² |
| | σ at rupture | = 290 kp/cm² |
| DIN 53512 | Recoil elasticity: | = 21% |

The granulate rapidly plasticized on melting rollers and could be removed with paper, textiles or release paper at 160° to 190°C. Foils removed with release paper and coated textiles had a pleasant leathery handle.

Comparison Test 3a (without preliminary chain lengthening)

The procedure was the same as in Experiment 3 but instead of using a partly chain lengthened diol-urethane, polycaprolactone esters with molecular weights of 1700 and 3600, respectively, were used. The polyurethane elastomers obtained have high recoil elasticity (35 and 32%).

When tested by processing on melting rollers, the products had a conspicuously narrow melting range (168°±3°C). The foils obtained were inhomogeneous and streaky. Textile coatings had a rubber-like character.

Example 4

100 parts by weight of a polyester from hexandiol and adipic acid (molecular weight 1000, OH number 112) and 11.5 parts by weight of 1-isocyanato-3,3,5-trimethyl-5-isocyanatomethylcyclohexane were stirred together for 3 hours at 130°C (molecular weight of the modified polyester: 2250; OH number = 49.8).

100 parts by weight of this diol-urethane were mixed with 11 parts by weight of butane-1,4-diol, 2 parts by weight of 2,6-bis-(di-t-butylphenyl)-carbodiimide, 1.5 parts by weight of polysiloxane oil (molecular weight 3000) and 38.8 parts by weight of 4,4'-diisocyanatodiphenylmethane (NCO:OH = 0.93) and then processed as described in Example 1.

Test Values:

| DIN 53504 | σ 100 | = 50 kp/cm² |
|---|---|---|
| | σ 300 | = 94 kp/cm² |
| | σ at rupture | = 290 kp/cm² |
| DIN 53512 | Recoil elasticity: | = 17% |

The granulate melted rapidly on melting rollers. The range within which it could be processed was 170° to 210°C. The foils and coated fabrics obtained had a pleasant handle.

Example 5

100 parts by weight of a butylene oxide polyether with OH number 112 (molecular weight = 1000) and 8.7 parts by weight of tolylene diisocyanate (isomeric mixture 2,4- : 2,6- = 65 : 35) were stirred together for half an hour at 90°C (OH number of the reaction product = 51,5).

100 parts by weight of this polyurethane were reacted with 11 parts by weight of butane-1,4-diol, 2 parts by weight of 2,6-bis-(di-t-butyl-phenyl) carbodiimide, 1.5 parts by weight of silicone oil and 39.2 parts by weight of 4,4'-diphenylmethane diisocyanate (NCO:OH = 0.93) as described in Example 1 and processed.

Test Values:

| DIN 53504 | σ 100 | = 46 kp/cm² |
|---|---|---|
| | σ 300 | = 97 kp/cm² |
| | σ at rupture | = 360 kp/cm² |
| DIN 53512 | Recoil elasticity | = 26% |
| DIN 53445 | Damping maximum | = –35°C. |

The test on melting rollers showed that the melt viscosity of the product was substantially independent of the temperature at temperatures between 165° and 200°C. The foils obtained were homogeneous.

Comparison Test 5a (without preliminary chain lengthening)

When a polyether with a molecular weight of 2000 which had not been chain lengthened was used and the procedure was otherwise carried out as described in Example 5, the elastomers obtained had comparable mechanical strengths but their recoil elasticity was higher, being 38%, and when tested on melting rollers the elastomers were found to have only a narrow melting range of 172°±3°C. The granulate melted only slowly. The foil removed from the rollers was streaky.

What is claimed is:

1. Polyurethane elastomers which are the reaction products of
   a. a polyol with an average molecular weight of between 900 and 5300,
   b. 4,4'-diisocyanatodiphenylmethane and
   c. a diol with a molecular weight below 500, wherein the equivalent ratio of (b)/(a)+(c) is between 0.87 and 0.97 and (a) contains at least 40% by weight of a urethane of the formula

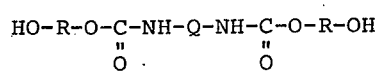

where:
R represents a divalent group obtained by removal of the hydroxyl groups from a diol having a molecular weight between 700 and 1750 and
Q represents a divalent aliphatic, cycloaliphatic, araliphatic or aromatic group containing 2 to 20 carbon atoms, with the proviso that Q is not

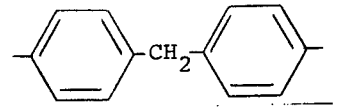

2. The elastomers of claim 1 wherein the polyol, (a), is the reaction product of a polyol having a molecular weight of between 700 and 1750 and an aliphatic, cycloaliphatic, araliphatic or aromatic polyisocyanate having 2 to 20 carbon atoms.

3. The elastomers of claim 2 wherein the polyol with a molecular weight of between 700 and 1750 is a hydroxyl polyester, polyether, polyhydric polythioether, polyacetal, polycarbonate or polyester amide.

4. The elastomers of claim 2 wherein the polyol with a molecular weight of between 700 and 1750 is a polyester containing two hydroxyl groups or a polyether containing two hydroxyl groups.

5. The elastomers of claim 2 wherein the polyol with a molecular weight of between 700 and 1750 is a polyester of adipic acid and divalent glycols.

6. The elastomers of claim 1 wherein the group Q, contains 4 to 15 carbon atoms.

7. The elastomers of claim 2 wherein the polyisocyanate has 4 to 15 carbon atoms.

8. The elastomers of claim 2 wherein the polyisocyanate is hexamethylene diisocyanate or 2,4- or 2,6-tolylene diisocyanate.

9. The elastomers of claim 1 wherein the diol, (c), is ethylene glycol, propylene glycol, 1,2-butylene glycol, 1,4-butylene glycol, 1,6-hexanediol and 1,8-octane diol.

10. The elastomers of claim 1 wherein the polyol, (a), has a molecular weight of between 1600 and 3700.

11. A multi-stage process for the production of polyurethane elastomers that can be worked up thermoplastically comprising the steps of:

a. reacting in a first reaction stage a polyol having a molecular weight of between 700 and 1750 with 0.2 to 0.7 equivalents, per equivalent of polyol, of an aliphatic, cycloaliphatic, araliphatic or aromatic polyisocyanate to produce a diol-urethane having a molecular weight of between 900 and 5300, and b. reacting in a second reaction stage the diolurethane of step (a) with 4,4'-diisocyanatodiphenylmethane and a diol having a molecular weight below 500 at an equivalents ratio of from 0.87 to 0.97 of 4,4'-diisocyanatodiphenylmethane to the total equivalents of diol-urethane and diol.

* * * * *